(12) United States Patent
Jung et al.

(10) Patent No.: US 12,190,490 B2
(45) Date of Patent: Jan. 7, 2025

(54) ELECTRONIC DEVICE IDENTIFYING INTEGRITY OF IMAGE USING PLURALITY OF EXECUTION ENVIRONMENTS AND METHOD OF CONTROLLING THE SAME

(71) Applicant: Samsung Electronics Co., Ltd., Suwon-si (KR)

(72) Inventors: Moongyu Jung, Suwon-si (KR); Wooyong Lee, Suwon-si (KR); Jinha Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 17/704,374

(22) Filed: Mar. 25, 2022

(65) Prior Publication Data

US 2023/0104756 A1   Apr. 6, 2023

Related U.S. Application Data

(63) Continuation of application No. PCT/KR2022/001511, filed on Jan. 27, 2022.

(30) Foreign Application Priority Data

Oct. 6, 2021   (KR) .................. 10-2021-0132088

(51) Int. Cl.
*G06T 7/00* (2017.01)
*G06T 3/40* (2006.01)
*G06V 10/74* (2022.01)

(52) U.S. Cl.
CPC .............. *G06T 7/0002* (2013.01); *G06T 3/40* (2013.01); *G06T 7/97* (2017.01); *G06V 10/74* (2022.01)

(58) Field of Classification Search
CPC .......... G06T 7/0002; G06T 3/40; G06T 7/97; G06V 10/74; G06V 10/46; G06V 10/761;
(Continued)

(56) References Cited

U.S. PATENT DOCUMENTS

2014/0321640 A1   10/2014   Johne et al.
2016/0359833 A1   12/2016   An et al.
(Continued)

FOREIGN PATENT DOCUMENTS

EP   3 849 130 A1   7/2021
EP   3 872 658 A1   9/2021
(Continued)

OTHER PUBLICATIONS

International Search Report and Written Opinion dated Jun. 17, 2022, issued in International Patent Application No. PCT/KR2022/001511.
(Continued)

*Primary Examiner* — Zhitong Chen
(74) *Attorney, Agent, or Firm* — Jefferson IP Law, LLP

(57) ABSTRACT

An electronic device includes at least one memory, a camera, and at least one processor, wherein the at least one processor is configured to: obtain raw image for an external object from the camera in a secure environment and store the obtained raw image in the at least one memory, to obtain first image from the raw image through first image processing and second image processing on the stored raw image in the secure environment, based on obtaining of a verification request from a normal environment: to obtain, in the secure environment, second image obtained from the raw image through the second image processing for the stored raw image in the normal environment, to obtain third image from the second image through the first image processing for the obtained second image in the secure environment, and to
(Continued)

identify integrity of the second image based on the obtained first image and the obtained third image.

20 Claims, 9 Drawing Sheets

(58) Field of Classification Search
CPC . G06V 10/82; G06F 2221/2105; G06F 21/74; G06F 21/64
See application file for complete search history.

(56) References Cited

U.S. PATENT DOCUMENTS

| | | | |
|---|---|---|---|
| 2017/0134396 A1 | 5/2017 | Bhargav-Spantzel et al. | |
| 2017/0302457 A1 | 10/2017 | Nakamoto | |
| 2019/0205518 A1* | 7/2019 | Moulin | G06V 40/171 |
| 2020/0401699 A1 | 12/2020 | Riehl et al. | |
| 2021/0211291 A1 | 7/2021 | Jindal et al. | |
| 2021/0279469 A1 | 9/2021 | Holland | |
| 2021/0287322 A1 | 9/2021 | Yaffe et al. | |

FOREIGN PATENT DOCUMENTS

| | | | | |
|---|---|---|---|---|
| JP | 2017-134542 A | | 8/2017 | |
| JP | 6422059 B2 | * | 11/2018 | ............. G06F 21/57 |
| KR | 10-2016-0118508 A | | 10/2016 | |
| KR | 10-2016-0143094 A | | 12/2016 | |
| WO | 2015/200858 A1 | | 12/2015 | |
| WO | WO-2022263452 A1 | * | 12/2022 | ............. G06F 21/32 |

OTHER PUBLICATIONS

Extended European Search report dated May 11, 2023, issued in European Patent Application No. 22711139.0.

* cited by examiner

ELECTRONIC DEVICE IDENTIFYING INTEGRITY OF IMAGE USING PLURALITY OF EXECUTION ENVIRONMENTS AND METHOD OF CONTROLLING THE SAME

CROSS-REFERENCE TO RELATED APPLICATION(S)

This application is a continuation application, claiming priority under § 365(c), of an International application No. PCT/KR2022/001511, filed on Jan. 27, 2022, which is based on and claims the benefit of a Korean patent application number 10-2021-0132088, filed on Oct. 6, 2021, in the Korean Intellectual Property Office, the disclosure of which is incorporated by reference herein in its entirety.

BACKGROUND

1. Field

The disclosure relates to an electronic device for identifying integrity of images and a method for controlling the same.

2. Description of Related Art

Various services and additional functions provided through electronic devices, for example, portable electronic devices such as smartphones, are gradually increasing. In order to improve usability of such electronic devices and to satisfy various user demands, communication service providers or electronic device manufacturers have been competitively developing electronic devices to provide various functions and to differentiate them from others. Accordingly, various functions provided through electronic devices are reaching higher levels.

Electronic devices may perform authentication regarding users through images related to users, and may provide various services that require security (for example, financial transactions) according to the result of authentication.

The above information is presented as background information only to assist with an understanding of the disclosure. No determination has been made, and no assertion is made, as to whether any of the above might be applicable as prior art with regard to the disclosure.

An electronic device may capture images of a user by using cameras and may authenticate the user based on the images (or moving images) of the user. However, artificial intelligence (AI) technologies have recently been developed, thereby posing risks of counterfeiting/modifying user images. For example, there is a possibility that a deep fake technology may be applied to a user image (for example, raw image) obtained from a camera, thereby counterfeiting/modifying the user image, and user authentication may be performed based on the counterfeited/modified image. Even if the electronic device performs user authentication in a secure environment (for example, trusted execution environment (TEE)) isolated from a normal environment (for example, rich execution environment (REE)) in terms of software and/or hardware, there is a possibility that a different user other than the actually authenticated user may be identified as an authenticated user because user authentication is performed based on already counterfeited/modified images.

It may be considered to perform, by the electronic device, image processing related to user images obtained from cameras and user authentication in the secure environment. However, since images obtained from cameras are large-sized images (for example, high-resolution (for example, ultra-high definition (UHD)) images), there may be restrictions on the application processor (AP) core and/or memory if image processing and user authentication are both performed in the secure environment.

Various embodiments may provide an electronic device and a method for controlling the same, wherein a raw image is obtained from a camera in a secure environment, and at least one type of image processing is performed with regard to the obtained raw image in the secure environment, thereby generating verification data (for example, reference image for user authentication).

Various embodiments may provide an electronic device and a method for controlling the same, wherein an image generated through image processing related to a raw image in a normal environment is provided to a secure environment, and the image is compared with verification data in the secure image, thereby identifying integrity of the image that has undergone image processing in the normal environment.

Additional aspects will be set forth in part in the description which follows and, in part, will be apparent from the description, or may be learned by practice of the presented embodiments.

SUMMARY

According to various embodiments, an electronic device may include at least one memory, a camera, and at least one processor, wherein the at least one processor is configured to: obtain raw image for an external object from the camera in a secure environment and store the obtained raw image in the at least one memory, obtain first image from the raw image through first image processing and second image processing on the stored raw image in the secure environment, based on obtaining of a verification request from a normal environment: obtain, in the secure environment, second image obtained from the raw image through the second image processing for the stored raw image in the normal environment, obtain third image from the second image through the first image processing for the obtained second image in the secure environment, and identify integrity of the second image based on the obtained first image and the obtained third image.

According to various embodiments, a method of controlling an electronic device may include obtaining raw image for an external object from the camera in a secure environment and storing the obtained raw image in the at least one memory, obtaining first image from the raw image through first image processing and second image processing on the stored raw image in the secure environment, based on obtaining of a verification request from a normal environment: obtaining, in the secure environment, second image obtained from the raw image through the second image processing for the stored raw image in the normal environment, obtaining third image from the second image through the first image processing for the obtained second image in the secure environment, and identifying integrity of the second image based on the obtained first image and the obtained third image.

According to various embodiments, an electronic device may perform image processing that requires many resources with regard to user images in a normal environment, and may identify integrity of images that have undergone image processing in the normal environment by using verification data generated in a secure environment, thereby reducing resources for image processing used in the secure environment, and preventing risks of counterfeit/modification that may occur in the normal environment.

Various advantageous effects exhibited by the disclosure are not limited to the above-mentioned advantageous effects.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
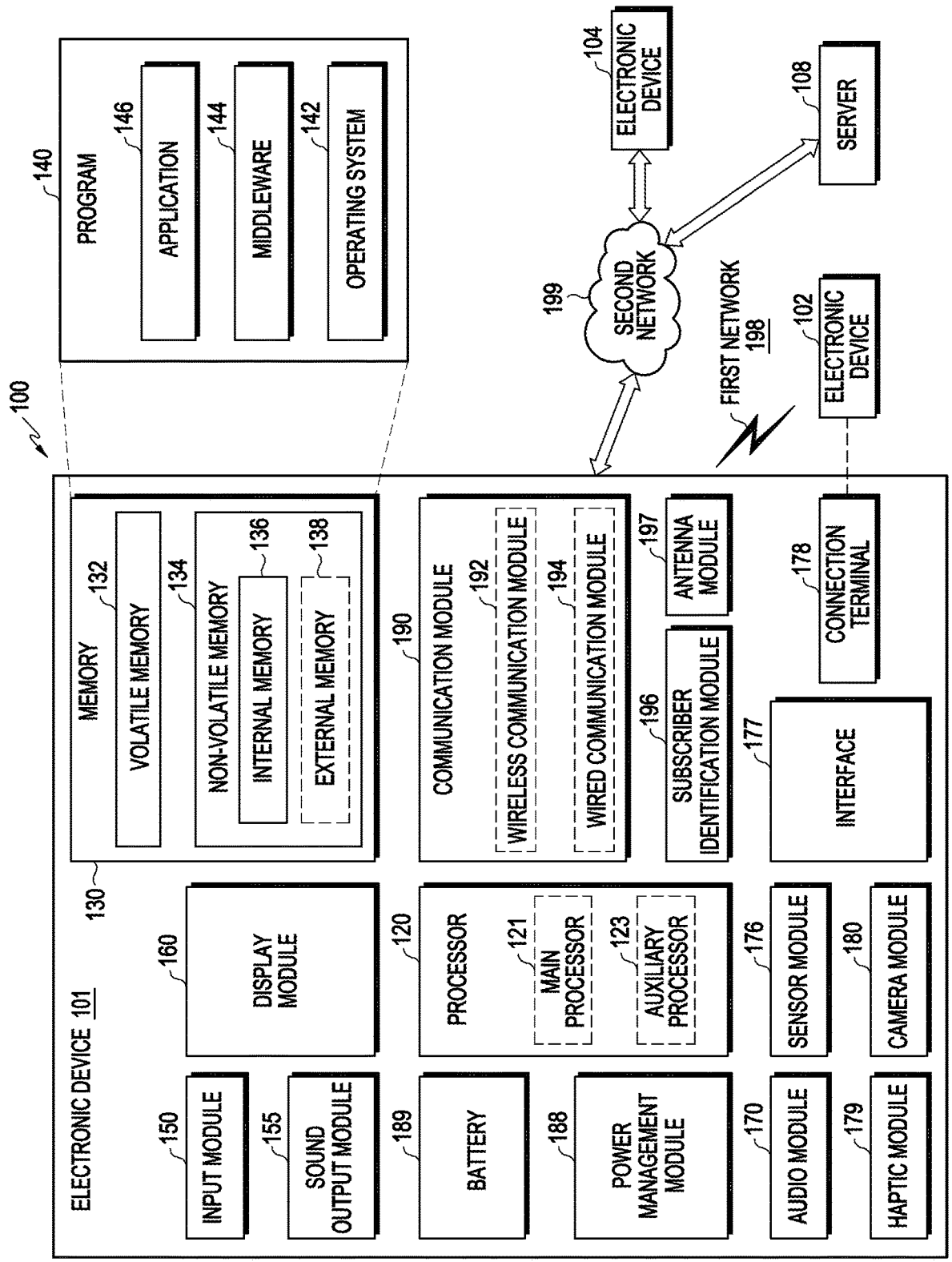
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, in the network environment 100, the electronic device 101 may communicate with an electronic device 102 through a first network 198 (e.g., a short-range wireless communication network) or may communicate with at least one of an electronic device 104 or a server 108 through a second network 199 (e.g., a telecommunication communication network). According to an embodiment, the electronic device 101 may communicate with the electronic device 104 through the server 108. According to an embodiment, the electronic device 101 may include a processor 120, a memory 130, an input module 150, a sound output module 155, a display module 160, an audio module 170, a sensor module 176, an interface 177, a connectivity terminal 178, a haptic module 179, a camera module 180, a power management module 188, a battery 189, a communication module 190, a subscriber identification module 196, or an antenna module 197. In some embodiments, at least one (e.g., the connectivity terminal 178) of these components may be omitted or one or more other components may be added to the electronic device 101. In some embodiments, some (e.g., the sensor module 176, the camera module 180, or the antenna module 197) of these components may be integrated into one component (e.g., display module 160).

The processor 120 may control at least one other component (e.g., a hardware or software component) of the electronic device 101 connected to the processor 120 by executing, for example, software (e.g., the program 140), and may perform various data processing or operations. According to an embodiment, as at least a part of data processing or operation, the processor 120 may store commands or data received from another component (e.g., the sensor module 176 or the communication module 190) in a volatile memory 132, may process the commands or data stored in the volatile memory 132, and may store the result data in a nonvolatile memory 134. According to an embodiment, the processor 120 may include a main processor 121 (e.g., a central processing unit or an application processor) or an auxiliary processor 123 (e.g., a graphic processing unit, a neural processing unit (NPU), an image signal processor, a sensor hub processor, or a communication processor)that can operate independently or together with the main processor. For example, when the electronic device 101 includes the main processor 121 and the auxiliary processor 123, the auxiliary processor 123 may use less power than the main processor 121 or may be configured to be specialized for a specified function. The auxiliary processor 123 may be implemented separately from or as a part of the main processor 121. The auxiliary processor may be implemented separately from or as a part of the main processor 121.

The auxiliary processor 123 may control at least some of functions or states related to at least one component (e.g., the display module 160, the sensor module 176, or the communication module 190) of the components of the electronic device 101 on behalf of the main processor 121 while the main processor 121 is in an inactive (e.g., sleep) state, or together with the main processor 121 while the main processor 121 is in an active (executing an application) state. According to an embodiment, the auxiliary processor 123 (e.g., an image signal processor or a communication processor) may be implemented as a part of another functionally related component (e.g., the camera module 180 or the communication module 190). According to an embodiment, the auxiliary processor 123 (e.g., the NPU) may include a hardware structure specialized for processing an artificial intelligence model. The artificial intelligence models may be generated through machine learning. Such learning may be performed, for example, in the electronic device 101 itself on which the artificial intelligence model is performed, or may be performed through a separate server (e.g., the server 108). The learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above networks, but is not limited to the above examples. The artificial intelligence model may additionally or alternatively include a software structure in addition to the hardware structure.

The memory 130 may store various types of data used by at least one component (e.g., the processor 120 or the sensor module 176) of the electronic device 101. The data may include, for example, input data or output data for software (e.g., the program 140) and commands related thereto. The memory 130 may include a volatile memory 132 or a nonvolatile memory 134.

The program 140 may be stored as software in the memory 130, and may include, for example, an operating system 142, middleware 144, or an application 146.

The input module 150 may receive a command or data to be used by a component (e.g., the processor 120) of the electronic device 101 from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker can be used for general purposes such as multimedia playback or recording playback. The receiver may be used to receive an incoming call. According to an embodiment, the receiver may be implemented separately from or as a part of the speaker.

The display module 160 may visually provide information to the outside (e.g., a user) of the electronic device 101. The display module 160 may include, for example, a control circuit for controlling a display, a hologram device, or a projector and a corresponding device. According to an embodiment, the display module 160 may include a touch sensor configured to sense a touch or a pressure sensor configured to measure the intensity of a force generated by the touch.

The audio module 170 may convert sound into an electric signal or, conversely, convert an electric signal into sound. According to an embodiment, the audio module 170 may acquire sound through the input module 150, or may output sound through an external electronic device (e.g., the electronic device 102) (e.g., a speaker or a headphone) connected directly or wirelessly with the electronic device 101.

The sensor module 176 may detect an operating state (e.g., power or temperature) of the electronic device 101 or an external environmental state (e.g., a user state), and may generate an electrical signal or data value corresponding to the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols that may be used for the electronic device 101 to be directly or wirelessly connected to an external electronic device (e.g., the electronic device 102). According to an embodiment, the interface 177 may include, for example, a high definition multimedia interface (HDMI), a universal serial bus (USB) interface, an SD card interface, or an audio interface.

The connectivity terminal 178 may include a connector through which the electronic device 101 can be physically connected to an external electronic device (e.g., the electronic device 102). According to an embodiment, the connectivity terminal 178 may include, for example, an HDMI connector, a USB connector, an SD card connector, or an audio connector (e.g., a headphone connector).

The haptic module 179 may convert an electrical signal into a mechanical stimulus (e.g., vibration or movement) or an electrical stimulus that the user can perceive through tactile or kinesthetic sense. According to an embodiment, the haptic module 179 may include, for example, a motor, a piezoelectric element, or an electrical stimulation device.

The camera module 180 may photograph still images and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a non-rechargeable primary cell, a rechargeable secondary cell, or a fuel cell.

The communication module 190 may support establishment of a direct (e.g., wired) communication channel or a wireless communication channel between the electronic device 101 and an external electronic device (e.g., the electronic device 102, the electronic device 104, or the server 108) and may support communication performance through the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range communication module, or a global navigation satellite system (GNSS) communication module) or a wired communication module 194 (e.g., a local area network (LAN) communication module or a power line communication module). A corresponding communication module among these communication modules may communicate with the external electronic device 104 through a first network 198 (e.g., a short-range communication network such as Bluetooth, wireless fidelity (Wi-Fi) direct or infrared data association (IrDA)) or a second network 199 (e.g., a telecommunication communication network such as a legacy cellular network, a 5$^{th}$ generation(5G) network, a next-generation communications network, the Internet, or a computer network {e.g., a LAN or WAN}). These various types of communication modules may be integrated into one component (e.g., a single chip) or may be implemented as a plurality of components (e.g., multiple chips) separate from each other. The wireless communication module 192 may use subscriber information (e.g., International mobile subscriber identifier (IMSI)) stored in the subscriber identification module 196 to identify or authenticate the electronic device 101 in a communication network such as the first network 198 or the second network 199.

The wireless communication module 192 may support a 5G network after a 4$^{th}$ generation (4G) network and a next-generation communication technology, for example, a new radio (NR) access technology. The NR access technology may support an enhanced mobile broadband (eMBB) of high-speed transmission of high-capacity data, minimization of terminal power and massive machine type communications {mMTC}), or ultra-reliable and low-latency communications (URLLC). The wireless communication module 192 may support a high frequency band (e.g., mmWave band) to achieve, for example, a high data rate. The wireless communication module 192 may support various technologies for securing performance in a high frequency band, for example, beamforming, massive multiple-input and multiple-output (MIMO), a full dimensional MIMO (FD-MIMO), an array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, loss coverage (e.g., 164 dB or less) for realizing mMTC, or U-plane latency for realizing URLLC (e.g., downlink (DL) and uplink (UL) each 0.5 ms or less, or round trip 1 ms or less).

The antenna module 197 may transmit or receive a signal or power to the outside (e.g., an external electronic device). According to an embodiment, the antenna module 197 may include an antenna including a conductor formed on a substrate (e.g., a PCB) or a radiator formed of a conductive pattern. According to an embodiment, the antenna module 197 may include a plurality of antennas (e.g., an array antenna). In this case, at least one antenna suitable for a communication method used in a communication network such as the first network 198 or the second network 199 may be selected from the plurality of antennas, for example, the communication module 190. A signal or power may be transmitted or received between the communication module 190 and an external electronic device through the selected at least one antenna. According to some embodiments, other components (e.g., a radio frequency integrated circuit {RFIC}) other than the radiator may be additionally formed as a part of the antenna module 197.

According to various embodiments, the antenna module 197 may form a mmWave antenna module. According to one embodiment, the mmWave antenna module may include a printed circuit board, an RFIC that is disposed on or adjacent to a first surface (e.g., a bottom surface) of the printed circuit board and can support a designated high frequency band (e.g., a mmWave band), and a plurality of antennas (e.g., an array antenna) that is disposed on or adjacent to a second surface (e.g., a top surface or a side surface) of the printed circuit board and can transmit or receive a signal of the designated high frequency band.

At least some of the components may be connected to each other through a communication method between peripheral devices (e.g., a bus, general purpose input and output (GPIO), serial peripheral interface (SPI), or mobile industry processor interface (MIPI)), and may exchange signals (e.g., commands or data) with each other.

According to an embodiment, the commands or data may be transmitted or received between the electronic device 101 and the external electronic device 104 through the server 108 connected to the second network 199. Each of the external electronic devices 102 or 104 may be the same as or different from the electronic device 101. According to an embodiment, all or part of the operations executed in the electronic device 101 may be executed in one or more external electronic devices 102, 104, or 108. For example, when the electronic device 101 is to perform a function or service automatically or in response to a request from a user or other device, the electronic device 101 may request performance of the function or service from one or more external electronic devices instead of executing the function or service itself or alternatively or additionally. The one or more external electronic devices having received the request may execute at least a part of the requested function or service or an additional function or service related to the request, and may transmit a result of the execution to the electronic device 101. The electronic device 101 may process the result as it is or additionally and may provide the processed result as at least a part of a response to the request. To this end, for example, cloud computing, distributed computing, mobile edge computing (MEC), or client-server computing technology may be used. The electronic device 101 may provide an ultra-low latency service using, for example, distributed computing or mobile edge computing. In another embodiment, the external electronic device 104 may include an Internet of things (IoT) device. The server 108 may be an intelligent server using machine learning and/or a neural network. According to an embodiment, the external electronic device 104 or the server 108 may be included in the second network 199. The electronic device 101 may be applied to an intelligent service (e.g., a smart home, a smart city, a smart car, or a health care) based on 5G communication technology and IoT-related technology.

Figure 2:
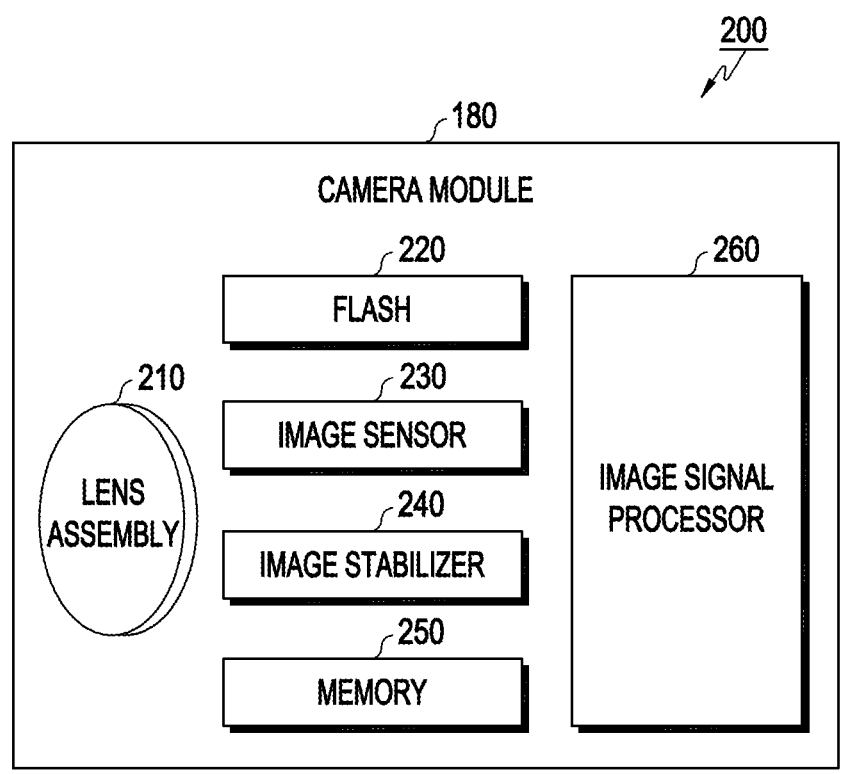
FIG. 2 is a block diagram illustrating a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from a subject to be imaged. The lens assembly 210 may include one or more lenses. According to an embodiment, the camera module 180 may include a plurality of lens assemblies 210. In this case, the camera module 180 may form, for example, a dual camera, a 360 degree camera, or a spherical camera. Some of the plurality of lens assemblies 210 may have the same lens properties (e.g., an angle of view, a focal length, an auto focus, f number, or optical zoom), or at least one lens assembly may have one or more lens properties that are different from lens properties of another lens assembly. The lens assembly 210 may include, for example, a wide-angle lens or a telephoto lens.

The flash 220 may emit light used to enhance light emitted or reflected from the subject. According to an embodiment, the flash 220 may include one or more light emitting diodes (e.g., a red-green-blue (RGB) LED, a white LED, an infrared LED, or an ultraviolet LED), or a xenon lamp. The image sensor 230 may acquire an image corresponding to the subject by converting light emitted or reflected from the subject and transmitted through the lens assembly 210 into an electrical signal. According to an embodiment, the image sensor 230 may include, for example, one image sensor selected from among image sensors having different properties, such as an RGB sensor, a black and white (BW) sensor, an IR sensor, or an ultraviolet (UV) sensor, a plurality of image sensors having the same property, or a plurality of image sensors having different properties. Each of the image sensors included in the image sensor 230 may be implemented using, for example, a charged coupled device (CCD) sensor or a complementary metal oxide semiconductor (CMOS) sensor.

In response to the movement of the camera module 180 or the electronic device 101 including the same, the image stabilizer 240 may move at least one lens or the image sensor 230 included in the lens assembly 210 in a specific direction, or may control(e.g., adjusting read-out timing or the like) the operation of the image sensor 230. This makes it possible to compensate for at least some of negative effects by the movement on the image being taken. According to an embodiment, the image stabilizer 240 may detect such a movement of the camera module 180 or the electronic device 101 using a gyro sensor (not shown) or an acceleration sensor (not shown) disposed inside or outside the camera module 180. According to an embodiment, the image stabilizer 240 may be implemented as, for example, an optical image stabilizer. The memory 250 may at least temporarily store at least a portion of the image acquired through the image sensor 230 for a next image processing operation. For example, when image acquisition is delayed according to the shutter or a plurality of images are acquired at high speed, the acquired raw image (e.g., a Bayer-patterned image or a high-resolution image) may be stored in the memory 250 and a copy image corresponding thereto (e.g., a low-resolution image) may be previewed through the display module 160. Thereafter, when a specified condition is satisfied (e.g., a user input or a system command), at least a portion of the raw image stored in the memory 250 may be obtained and processed by, for example, the image signal processor 260. According to an embodiment, the memory 250 may be configured as at least a part of the memory 130 or as a separate memory operated independently of the memory 130.

The image signal processor 260 may perform one or more image processing on an image acquired through the image sensor 230 or an image stored in the memory 250. The one or more image processes may include, for example, depth map generation, 3D modeling, panorama generation, feature point extraction, image synthesis, or image compensation (e.g., noise reduction, resolution adjustment, brightness adjustment, blurring, sharpening, or softening). Additionally or alternatively, the image signal processor 260 may perform control (e.g., an exposure time limit or read-out timing control) on at least one (e.g., the image sensor 230) among the components included in the camera module 180. The image processed by the image signal processor 260 may be stored again in the memory 250 for further processing, or may be provided to an external component (e.g., the memory 130, the display module 160, the electronic device 102, the electronic device 104, or the server 108) of the camera module 180. According to an embodiment, the image signal processor 260 may be configured as at least a part of the processor 120 or as a separate processor operated independently of the processor 120. When the image signal processor 260 is configured as a processor separate from the processor 120, at least one image processed by the image signal processor 260 may be displayed as is by the processor 120, or may be displayed through the display module 160 after being subjected to additional image processing.

According to an embodiment, the electronic device 101 may include a plurality of camera modules 180 each having different properties or functions. In this case, for example, at least one of the plurality of camera modules 180 may be a wide-angle camera, and at least the other thereof may be a telephoto camera. Similarly, at least one of the plurality of camera modules 180 may be a front camera, and at least the other thereof may be a rear camera.

Figure 3A:
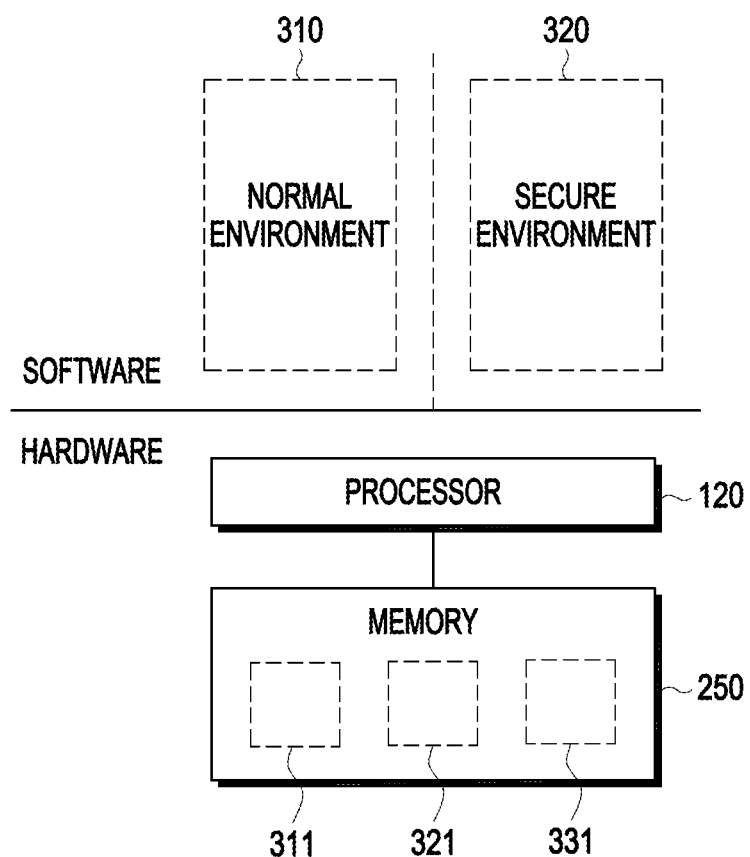
FIG. 3A is a diagram illustrating an example of an execution environment of an electronic device when a single processor is provided according to various embodiments.
Figure 3B:
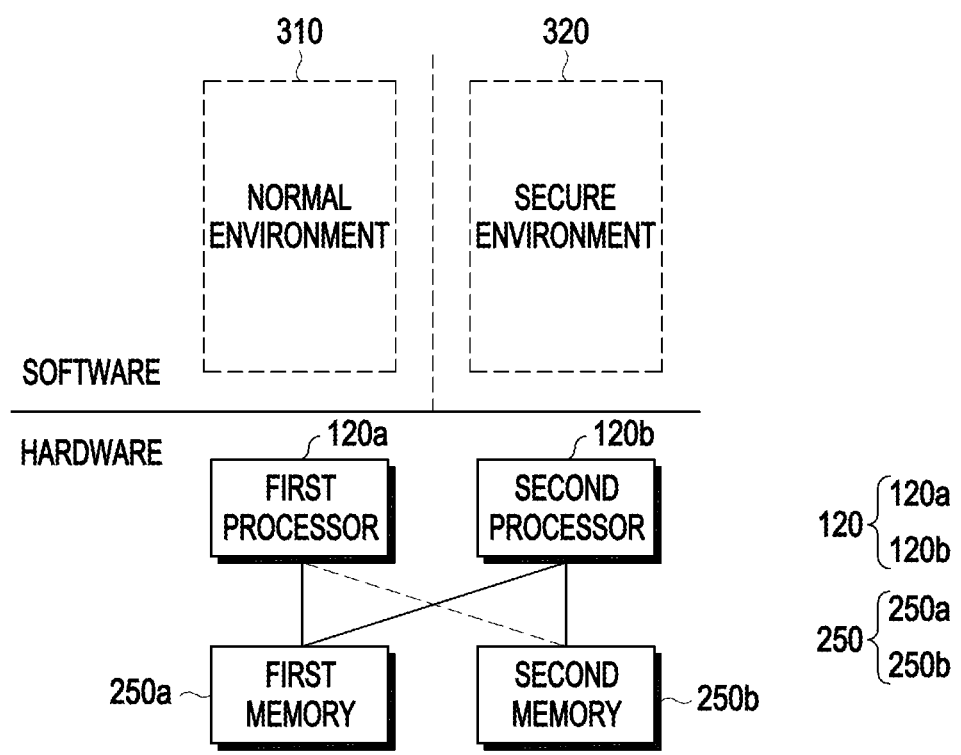
FIG. 3B is a diagram illustrating an example of an execution environment of an electronic device when a multi-processor is provided according to various embodiments.

FIG. 3A is a diagram illustrating an example of an execution environment of an electronic device (e.g., the electronic device 101 of FIG. 1) when a single processor (e.g., the processor 120 of FIG. 1) is provided according to various embodiments. FIG. 3B is a diagram illustrating an example of an execution environment of the electronic device 101 when a multi-processor (e.g., the first processor 120*a* and the second processor 120*b*) is provided according to various embodiments.

Referring to FIGS. 3A and/or 3B, the left and right sides with respect to the dotted line may represent different execution environments (e.g., a normal environment 310 and a secure environment 320). According to various embodiments, the processor 120 (or the first processor 120*a* and the second processor 120*b*) may include an application processor (AP), an image signal processor (ISP) (e.g., the signal processor 360 of FIG. 2), a central processing unit (CPU), a graphic processing unit (GPU), a display processing unit (DPU), and/or a neural processing unit (NPU). According to various embodiments, the processor 120 may perform an operation executed in a plurality of execution environments isolated from each other. For example, the plurality of execution environments may be implemented as software-isolated execution environments or hardware-isolated execution environments. According to various embodiments, the processor 120 (or the first processor 120*a* and the second processor 120*b*) may operate in at least one of the plurality of execution environments to perform a specified operation, and/or may control at least one hardware component included in the electronic device 101.

Referring to FIG. 3A, an example in which execution environments in which a plurality of execution environments are isolated in software manner are implemented is illustrated.

According to various embodiments, the electronic device 101 may be implemented to perform an operation (or a function) based on a plurality of execution environments isolated (or independent) from each other in software manner. For example, the plurality of execution environments may include a normal environment 310 (or a non-secure environment) and a secure environment 320. According to an embodiment, the normal environment 310 may be referred to as a rich execution environment (REE) or a normal world. According to an embodiment, the secure environment 320 may be referred to as a trusted execution environment (TEE) or a secure world. According to an embodiment, the plurality of execution environments may further include various execution environments that can be implemented to be isolated (or independently) from each other in addition to the above-described normal environment 310 and secure environment 320. According to various embodiments, the plurality of execution environments may be interpreted as a kind of execution mode of the single processor 120. For example, in the case of the electronic device 101 illustrated in FIG. 3A, which will be described later, the processor 120 may perform an operation in the normal environment 310 for a first time period or may perform an operation in the secure environment 320 for another second time period. According to various embodiments, hardware and authorities allocated to each of the plurality of execution environments (e.g., the normal environment 310 and the secure environment 320) may be different from each other. For example, referring to FIG. 3A, hardware devices located on the left side with respect to the dotted line may be allocated to the normal environment 310 (or driven in the normal environment 310), and hardware devices located on the right side may be allocated to the secure environment 320 (or driven in the secure environment 320). For example, referring to FIG. 3A, a designated area of the memory 250 may be allocated for each of the plurality of execution environments (e.g., the normal environment 310 and the secure environment 320), so that the processor 120 can read and write data in a first area 311 of the memory 250 allocated to the normal environment 310 in the normal environment 310, and can read and write data in a second area 321 of the memory 250 allocated to the secure environment 320 in the secure environment 320. According to an embodiment, the first area 311 of the memory 250 may be referred to as a non-secure memory (or a non-secure buffer memory). According to an embodiment, the second area 321 of the memory 250 may be referred to as a secure memory (or a secure buffer memory). According to various embodiments, the authorities and/or security for the secure environment 320 may be higher than the authorities and/or security for the normal environment 310. For example, the processor 120 can read and write data by accessing the memory 250 (e.g., the first area 311) allocated to the normal environment 310 in the secure environment 320, but access to the memory 250 (e.g., the second area 321) allocated to the secure environment 320 in the normal environment 310 may be limited (e.g., cannot write data in the first area 311 or cannot read data stored in the first area 311). According to various embodiments, the memory 250 may further include a third area 331. According to an embodiment, the third area 331 may be included as a part of the second area 321. According to an embodiment, the third area 331 of the memory 250 may be referred to as a shared memory (or a shared buffer memory). According to various embodiments, access to the normal environment 310 may be partially permitted to the third area 331. For example, the processor 120 may read data stored in the third area 331 in the normal environment 310, but the authority of the processor 120 may be limited such that data cannot be written to the third area 331 in the normal environment 310. According to various embodiments, the third area 331 may be allocated to the secure environment 320, and it may be described that access to the third area 331 is at least partially allowed (e.g., read authority) in the normal environment 310. Alternatively, the third area 331 may be allocated to the normal environment 310 and the secure environment 320, and it may be described that access to the third area 331 may be at least partially (e.g., write authority) limited in the normal environment 310. According to an embodiment, the third area 331 may be included as a part of the second area 321. In this case, it may be described that, in the normal environment 310, read authority is allowed to the processor 120 but write authority is not allowed thereto with respect to a part of the second area 321 (e.g., the third area 331).

Referring to FIG. 3B, an example in which a plurality of execution environments are implemented as hardware-isolated execution environments is illustrated.

According to various embodiments, the electronic device 101 may be implemented to perform operations (or functions) in a plurality of execution environments based on hardware (e.g., the memories 250a and 250b and/or processors 120a and 120b) implemented independently of each other. For example, in the electronic device 101, the hardware (e.g., the memories 250a and 250b) and/or the processors 120a and 120b may be allocated for each of the execution environments (e.g., the normal environment 310 and the secure environment 320), and the authorities may be different. For example, the first processor 120a may execute a separate and independent operating system in the normal environment 310 to perform at least one operation, and may read and write data to and from the first memory 250a. The second processor 120b may execute a separate and independent operating system from and of the operating system of the normal environment 310 in the secure environment 320 to perform at least one operation, and may read and write data in the second memory 250b. According to an embodiment, the first memory 250a may be referred to as a non-secure memory (or a non-secure buffer memory). According to an embodiment, the second memory 250b may be referred to as a secure memory (or secure buffer memory). According to an embodiment, although the electronic device 101 is illustrated as including the first memory 250a and the second memory 250b in FIG. 3B, as illustrated in FIGS. 3A and/or 3B, the electronic device 101 may include one memory 250, and the areas 311, 321, and 331 may be allocated to the plurality of execution environments. According to various embodiments, the authorities and/or security for the secure environment 320 may be higher than the authorities and/or security for the normal environment 310. For example, the first processor 120a may operate in the normal environment 310, so that the authority of the first processor 120a to the second memory 250b allocated to the secure environment 320 may be limited. For example, the first processor 120a may read at least a portion of data stored in the second memory 250b, but the authority may be limited such that data cannot be written to the second memory 250b. For example, the second processor 120b may operate in the secure environment 320 to access not only the second memory 250b but also the first memory 250a allocated to the normal environment 310 may be possible. For example, the second processor 120b may write data to the first memory 250a and/or the second memory 250b, and/or may read data stored in the first memory 250a and/or the second memory 250b.

Figure 4:
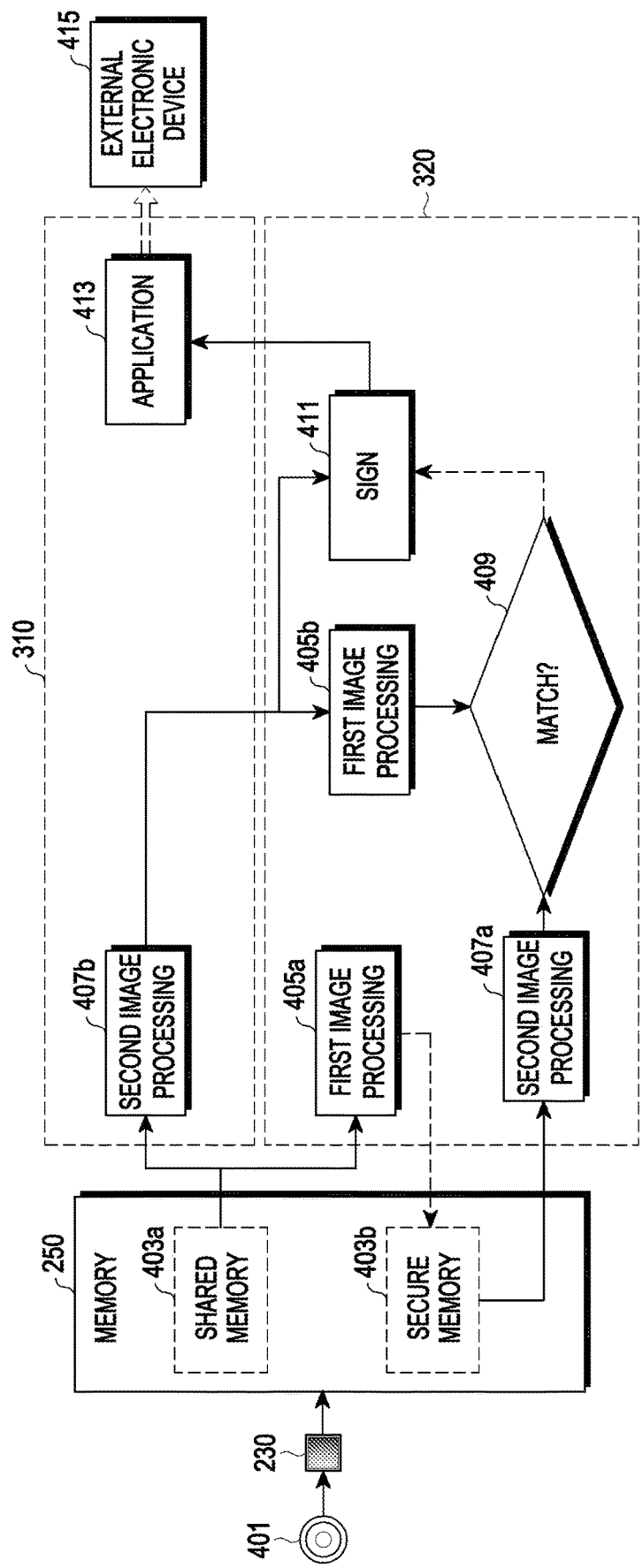
FIG. 4 is a block diagram illustrating a method for an electronic device to identify the integrity of an image according to various embodiments.

FIG. 4 is a block diagram illustrating a method for an electronic device (e.g., the electronic device 101 of FIG. 1) to identify the integrity of an image according to various embodiments.

According to various embodiments, the electronic device 101 may include a lens 401 (e.g., the lens assembly 210 of FIG. 2), an image sensor 230, a memory 250, and at least one processor (e.g., the processor 120 of FIG. 1).

According to various embodiments, the electronic device 101 (e.g., the processor 120) may include a normal environment 310 and a secure environment 320 that are isolated (or independent) from each other in software and/or hardware manner.

According to various embodiments, the at least one processor (e.g., the processor 120) may perform operations related to processing on raw images received from the image sensor 230 and/or at least one image stored in the memory 250. According to various embodiments, the at least one processor (e.g., the processor 120) may be included in a camera (e.g., the camera module 180 of FIG. 1), and/or in the outside (e.g., the electronic device 102 or 104 or the server 108 of FIG. 1) of a camera (e.g., the camera module 180). According to various embodiments, operations performed by the at least one processor (e.g., the processor 120) may be processed alone by a single processor (e.g., the processor 120 of FIG. 3A) or may be distributed and processed by a plurality of processors (e.g., the first and second processors 120a and 120b of FIG. 3B).

According to various embodiments, the memory 250 may include a shared memory 403a and a secure memory 403b. Although not shown, the memory 250 may further include a non-secure memory, and the non-secure memory may include, for example, the first area 311 of the memory 250 of FIG. 3A, or the first memory 250a of FIG. 3B, as described above. For example, the shared memory 403a may include the above-described first area 311 of the memory 250 of FIG. 3A or the second memory 250b of FIG. 3B. For example, the secure memory 403b may include the above-described second area 321 of the memory 250 of FIG. 3A or the second memory 250b of FIG. 3B. According to various embodiments, at least one processor (e.g., the processor 120) may read data stored in the shared memory 403a in the normal environment 310, but may be configured not to write (e.g., not to store) data in the shared memory 403a. The at least one processor (e.g., processor 120) may be configured to read data stored in the shared memory 403a in the secure environment 320 and/or to write data in the shared memory 403a. In other words, with respect to the shared memory 403a, in the normal environment 310, only read authority may be granted to the at least one processor (e.g., processor 120), whereas in the secure environment 320, read authority and write authority may be granted to the at least one processor (e.g., the processor 120). According to various embodiments, the at least one processor (e.g., the processor 120) may be configured not to access the secure memory 403b in the normal environment 310. For example, the at least one processor (e.g., the processor 120) may be configured not to read data stored in the secure memory 403b and not to write data to the secure memory 403b in the normal environment 310. The at least one processor (e.g., the processor 120) may be configured to read data stored in the secure memory 403b and/or write data to the secure memory 403b in the secure environment 320. In other words, with respect to the secure memory 403b, read authority and write authority are not granted to the at least one processor (e.g., the processor 120) in the normal environment 310, whereas in the secure environment 320, the read authority and the write authority may be granted to the at least one processor (e.g., the processor 120).

According to various embodiments, the at least one processor (e.g., the processor 120) may obtain at least one raw image from a camera (e.g., the camera module 180 of FIG. 1). For example, the at least one processor (e.g., the processor 120) may control the lens 401 and/or the image sensor 230 to obtain at least one raw image from the image sensor 230. For example, the raw image may have a Bayer format (e.g., a Bayer pattern image). For example, the obtained raw image (e.g., Bayer pattern image) may include an image of high resolution (e.g., ultra-high definition, UHD). In this case, the raw image may be expressed in any one color of red, green, or blue for pixels, and expressed as a bit-depth of 8 to 16 bits. Alternatively, a color filter array (CFA) pattern may be applied to the raw image. In this case, the raw image may have a layer structure including information on various colors (e.g., a plurality of colors among red, green, and blue) for one pixel. According to an embodiment, the raw image may include not only color information (e.g., RGB information), but also phase difference information. Meta data of information (e.g., photographing time, photographing location, and/or illuminance) associated with image photographing may be stored in association with the raw image.

According to various embodiments, the at least one processor (e.g., the processor 120) may obtain at least one raw image in the secure environment 320. For example, the at least one processor (e.g., the processor 120) may control the lens 401 and/or the image sensor 230 in the secure environment 320, and may obtain the raw image from the image sensor 230. According to various embodiments, the at least one processor (e.g., the processor 120) may store the at least one raw image obtained in the secure environment 320 in the shared memory 403a.

According to various embodiments, the at least one processor (e.g., the processor 120) may read (or load) at least one raw image stored in the shared memory 403a in the secure environment 320, and may perform at least one image processing with respect to the at least one raw image.

For example, the at least one processor (e.g., the processor 120) may perform first image processing 405a on the at least one raw image stored in the shared memory 403a in the secure environment 320. For example, the at least one processor (e.g., the processor 120) may perform downscaling on the raw image stored in the shared memory 403a. More specifically, the at least one processor (e.g., the processor 120) may perform processing of lowering the size or resolution of the raw image (e.g., lowering the resolution to 640*480), so that the downscaled at least one raw image can be obtained. The at least one processor (e.g., the processor 120) may perform downscaling on each of two or more raw images stored in the shared memory 403a. As another example, the at least one processor (e.g., the processor 120) may perform sampling on a plurality of raw images stored in the shared memory 403a. In more detail, when the electronic device 101 photographs a moving picture of an external subject in the secure environment 320, the at least one processor (e.g., the processor 120) may obtain a plurality of raw images from the image sensor 230 in the secure environment 320 and may store the obtained plurality of raw images in the shared memory 403a. The at least one processor (e.g., the processor 120) may select at least one of the plurality of raw images stored in the shared memory 403a. The at least one processor (e.g., the processor 120) may further perform downscaling on each of the selected at least one raw image to obtain at least one downscaled raw image of the selected at least one raw image.

For example, the at least one processor (e.g., the processor 120) may perform first image processing 405a on the at least one raw image in the secure environment 320, and may then perform second image processing 407a based on the processed at least one raw image in the secure environment 320. The at least one processor (e.g., the processor 120) may perform 3A operations (e.g., auto-focusing, auto-exposure, and auto-white balance adjustment) based on the processed at least one raw image, and/or may perform various image signal processing (ISP) (e.g., demosaicing) and/or post-processing operation with respect to the processed at least one raw image. According to various embodiments, the at least one processor (e.g., the processor 120) may perform the first image processing 405*a* on the at least one raw image in the secure environment 320, may store the processed at least one raw image in the secure memory 403*b*, and may perform the above-described second image processing 407*a* based on the at least one raw image stored in the secure memory 403*b*. According to an embodiment, the at least one processor (e.g., the processor 120) may perform the first image processing 405*a* on the at least one raw image in the secure environment 320, and may then immediately (e.g., without the processed at least one raw image storing in the secure memory 403*b*) perform the above-described second image processing 407*a* on the processed at least one raw image. According to various embodiments, as a result of performing the first image processing 405*a* and the second image processing 407*a* in the secure environment 320, at least one first image may be obtained. In describing various embodiments of the disclosure, the at least one first image may be described as "verification data". According to an embodiment, hash information of the at least one first image may be used as "verification data".

According to various embodiments, in the normal environment 310, the at least one processor (e.g., the processor 120) may read (or load) the at least one raw image stored in the shared memory 403*a*, and may perform at least one image processing based on the at least one raw image.

For example, the at least one processor (e.g., the processor 120) may perform the second image processing 407*b* on the at least one raw image stored in the shared memory 403*a* in the normal environment 310. According to various embodiments, the second image processing 407*b* may include 3A operations based on the stored at least one raw image and/or various image signal processing (ISP) for the at least one raw image stored in the shared memory 403*a*, and/or a post-processing operation. Since the second image processing 407*b* may be the same as the above-described second image processing 407*a* in the secure environment 320, a detailed description thereof will be omitted. According to various embodiments, as a result of performing the second image processing 407*b* in the normal environment 310, at least one second image may be obtained. According to various embodiments, the obtained at least one second image may include a high-resolution (e.g., UHD) image.

According to various embodiments, the at least one processor (e.g., the processor 120) may identify the integrity of the at least one second image in the secure environment 320. For example, the at least one processor (e.g., the processor 120) may obtain the at least one second image from the normal environment 310 in the secure environment 320. The at least one processor (e.g., processor 120) may perform first image processing 405*b* on the at least one second image obtained in the secure environment 320. According to various embodiments, the first image processing 405*b* may include downscaling and/or sampling on the obtained at least one second image. Since the first image processing 405*b* is the same as the above-described first image processing 405*a* on the at least one raw image stored in the shared memory 403*a*, a detailed description thereof will be omitted. According to various embodiments, as a result of performing the first image processing 405*a* in the secure environment 320, at least one third image may be obtained.

According to various embodiments, the at least one processor (e.g., the processor 120) may identify in 409 whether the at least one first image and the at least one third image match each other (or whether tampering is performed).

For example, the at least one processor (e.g., the processor 120) may identify in 409 whether the at least one first image and the obtained at least one second image match each other based on image matching on the at least one first image and the at least one third image. For example, the at least one processor (e.g., the processor 120) may compare RGB information of each pixel of the at least one first image with RGB information of each pixel of the at least one third image respectively. As another example, the at least one processor (e.g., the processor 120) may extract hash information of each of the at least one first image and hash information of each of the at least one third image, and may compare the extracted hash information. Since the at least one third image is generated as a result of performing first image processing 405*b* (e.g., downscaling) after second image processing 407*b* (e.g., demosaicing) on the at least one raw image, whereas the at least one first image is generated as a result of performing second image processing 407*a* (e.g., demosaicing) after first image processing 405*a* (e.g., downscaling) on the at least one raw image, a difference (e.g., demosaicing distortion) may occur between the at least one first image and the at least one third image. The at least one processor (e.g., the processor 120) may identify whether the at least one first image and the at least one third image match each other in consideration of the difference between the at least one first image and the at least one third image, and will be described in more detail with reference to the drawings to be described later.

For example, the at least one processor (e.g., the processor 120) may identify in 409 whether the at least one first image and the obtained at least one second image match each other based on feature matching on the at least one first image and the at least one third image. The at least one processor (e.g., the processor 120) may extract at least one feature of each of the at least one first image and at least one feature of each of the at least one third image by applying a feature extraction algorithm (e.g., scale-invariant feature transform (SIFT), speeded up robust features (SURF), and/or oriented and rotated BRIEF (ORB)) to each of the at least one first image and the at least one third image. The at least one processor (e.g., the processor 120) may compare the at least one feature of the first image with the at least one feature of the third image, and/or may compare neighboring pixel information of the first image and the neighboring pixel information of the third image, thereby determining whether the at least one first image and the at least one third image match each other. According to an embodiment, the at least one processor (e.g., the processor 120) may improve accuracy when identifying whether the at least one first image and the at least one third image match each other, based on edge and/or corner detection of each of the at least one first image and the at least one third image.

According to various embodiments, when it is identified that the at least one first image and the at least one third image match each other, the at least one processor (e.g., the processor 120) may identify that the at least one second image is not tampered (e.g., integrity), based on the image matching and/or feature matching result.

According to various embodiments, the at least one processor (e.g., the processor 120) may perform an operation of identifying whether the at least one first image and the at least one third image match each other based on a verification request from the normal environment 310. For example, when the verification request received from the normal environment 310 is identified, in the secure environment 320, the at least one processor (e.g., the processor 120) may identify in 409 whether the at least one first image and the obtained at least one second image match each other based on the image matching and/or feature matching described above. According to an embodiment, when the verification request is received from the normal environment 310, the at least one processor (e.g., the processor 120) may perform the above-described second image processing 407b on the at least one raw image stored in the shared memory 403a, the first image processing 405a on the at least one raw image stored in the shared memory 403a, and/or the above-described second image processing 407a on the at least one raw image stored in the secure memory 403b.

According to various embodiments, when the integrity of the at least one second image is identified, the at least one processor (e.g., the processor 120) may sign in 411 for the at least one second image. For example, the at least one processor (e.g., the processor 120) may generate a device private key associated with the at least one second image (or the electronic device 101). The at least one processor (e.g., the processor 120) may generate a device public key related to the at least one second image (or the electronic device 101). For example, the generated device private key and the generated device public key may correspond to each other (e.g., may be a pair), the device private key may be used for encryption of data, and the device public key may be used for decryption of data. The at least one processor (e.g., the processor 120) may transmit the device public key to an external electronic device 415 (e.g., the electronic device 102 or 104, or the server 108 of FIG. 1) through a communication circuit (e.g., the communication module 190 of FIG. 1). The at least one processor (e.g., the processor 120) may extract hash information (e.g., cryptographic hash information)(hereinafter, referred to as "image hash information") of the at least one second image and/or hash information (hereinafter referred to as "feature hash information") of the extracted feature of the at least one second image. For example, the image hash information may have a format including at least one letter and/or number, such as A8DF719CF8. The at least one processor (e.g., the processor 120) may generate signature information of the at least one second image from the extracted image hash information and/or the extracted feature hash information using the device private key. The at least one processor (e.g., the processor 120) may allow the generated signature information to be included in metadata associated with the at least one second image. In describing various embodiments of the disclosure, the at least one second image including the signature information in the metadata may be described as a "signed image".

According to an embodiment, when the integrity of the at least one second image is identified, the at least one processor (e.g., the processor 120) may encode the at least one second image and may then sign in 411 the encoded at least one second image.

According to various embodiments, the at least one processor (e.g., the processor 120) may provide the at least one signed image to an application 413. For example, the application 413 may include an application being executed in the normal environment 310.

According to various embodiments, the at least one processor (e.g., the processor 120) may provide the at least one signed image to the external electronic device 415 (e.g., the electronic device 102 or 104 or the server 108). For example, the at least one processor (e.g., the processor 120) may transmit the at least one signed image to the external electronic device (e.g., the electronic device 102 or 104, or server 108) through the communication circuit (e.g., the communication module 190).

According to various embodiments, the external electronic device 415 may verify the integrity of the received at least one signed image. For example, the external electronic device 415 may identify signature information of the at least one signed image and may decrypt the signature information using the device public key received from the electronic device 101. The external electronic device 415 may extract hash information (e.g., cryptographic hash information) of the at least one signed image and/or hash information of the feature of the at least one signed image. The external electronic device 415 may compare the decrypted signature information with the hash information (e.g., cryptographic hash information) of the at least one signed image and/or the hash information of the feature of the at least one signed image, thereby verifying the integrity of the at least one signed image.

Operations of the electronic device 101 described in the following flowcharts may be performed by the single processor 120 of FIG. 3A or the processors 120a and 120b of FIG. 3B. Hereinafter, for convenience of description, it will be described that the electronic device 101 performs the operations of the flowcharts.

Figure 5:
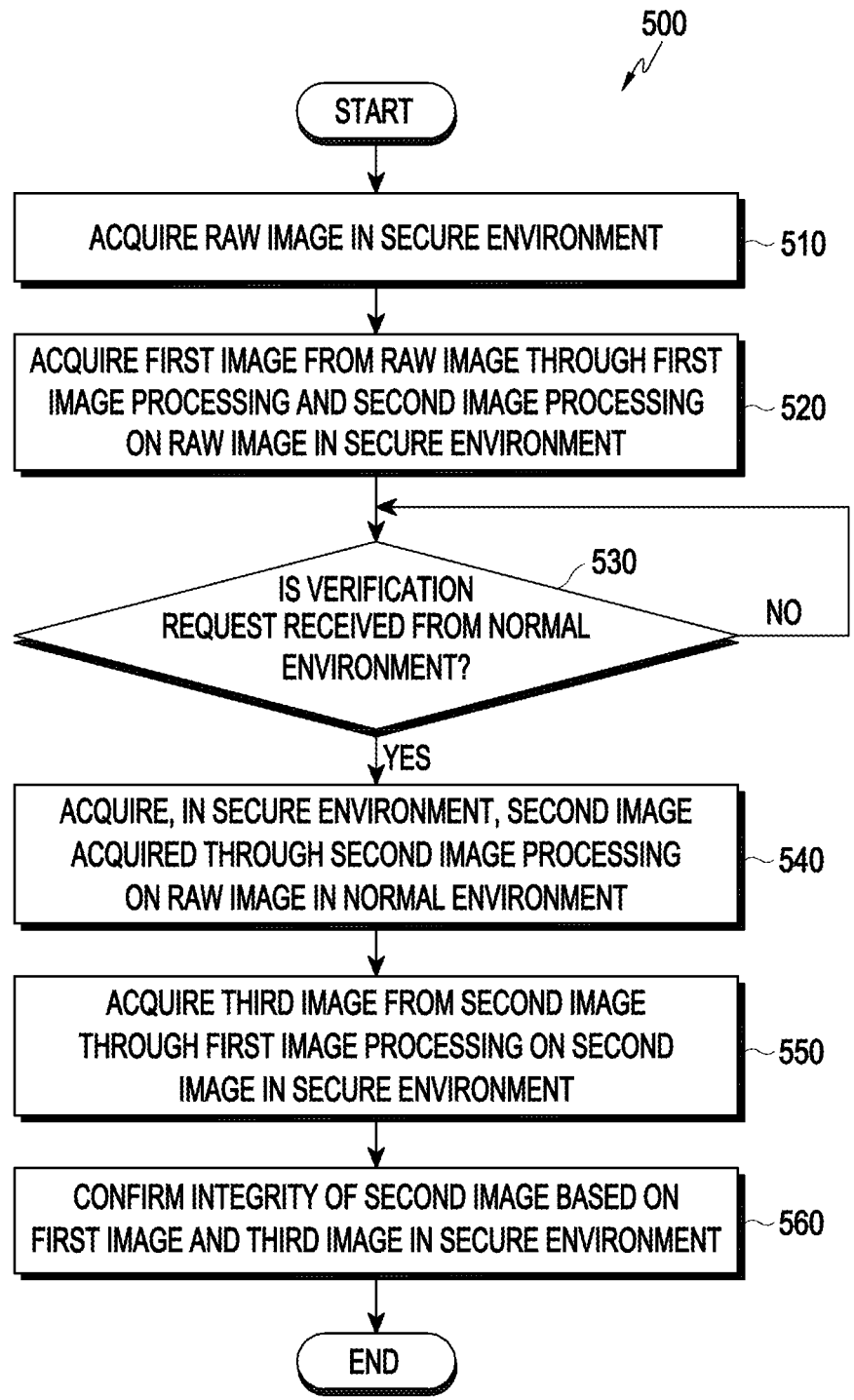
FIG. 5 is a flowchart illustrating a method for an electronic device to identify the integrity of an image obtained in a normal environment according to various embodiments.

FIG. 5 is a flowchart 500 illustrating a method for an electronic device (e.g., the electronic device 101 of FIG. 1) to identify the integrity of an image obtained in a normal environment (e.g., the normal environment 310 of FIG. 4) according to various embodiments.

According to various embodiments, in operation 510, the electronic device 101 may obtain a raw image in a secure environment (e.g., the secure environment 320 of FIG. 4). For example, the electronic device 101 may control an image sensor (e.g., the image sensor 230 of FIG. 4) in the secure environment 320 to obtain a raw image for an external subject (or an external object) (e.g., a user) from the image sensor 230. For example, the raw image may have a Bayer format (e.g., a Bayer pattern image). For example, the obtained raw image (e.g., the Bayer pattern image) may include an image of high resolution (e.g., ultra-high definition, UHD). According to various embodiments, the electronic device 101 may store the obtained raw image in a shared memory (e.g., the shared memory 403a of FIG. 4) in the secure environment 320. According to various embodiments, as to the electronic device 101, write authority to data stored in the shared memory 403a may be restricted in the normal environment 310, but write authority to data stored in the shared memory 403a may be configured to be allowed in the secure environment 320.

According to various embodiments, in operation 520, the electronic device 101 may obtain a first image from the raw image through first image processing (e.g., the first image processing 405a of FIG. 4) and second image processing (e.g., the second image processing 407a of FIG. 4) on the raw image in the secure environment 320. According to various embodiments, the electronic device 101 may perform the first image processing 405a on the raw image stored in the shared memory 403a in the secure environment 320. For example, the electronic device 101 may perform downscaling on the stored raw image in the secure environment 320. According to various embodiments, the electronic device 101 may perform the second image processing 407a based on the downscaled raw image in the secure environment 320. For example, the electronic device 101 may perform 3A operations based on the downscaled raw image, and/or may perform various image signal processing (e.g., demosaicing) and/or a post-processing operation on the downscaled raw image. According to various embodiments, the electronic device 101 may obtain a first image as a result of performing the first image processing 405a and the second image processing 407a in the secure environment 320. For example, the first image will be described as "verification data" for user's authentication. According to various embodiments, the electronic device 101 may store, in the secure memory 403b, the first image processed 405a raw image in the secure environment 320, and may perform the second image processing 407a on the stored raw image. According to various embodiments, as to the electronic device 101, in the normal environment 310, read authority and write authority to the data stored in the secure memory 403b are restricted, but in the secure environment 320, read authority and write authority to the data stored in the secure memory 403b may be configured to be allowed. According to an embodiment, the electronic device 101 may store the first image obtained by performing the second image processing 407a in the secure memory 403b.

According to various embodiments, in operation 530, the electronic device 101 may identify whether a verification request from the normal environment 310 is received.

According to various embodiments, when the verification request is not received from the normal environment 310, the electronic device 101 may repeat operation 530. For example, the electronic device 101 may repeatedly identify whether the verification request is received until the verification request is received from the normal environment 310.

According to various embodiments, when the verification request is received from the normal environment 310, in operation 540, the electronic device 101 may obtain a second image obtained through second image processing (e.g., the second image processing 407b of FIG. 4) in the normal environment 310. The second image may be obtained from the secure environment 320 where it may have been stored securely. For example, in the normal environment 310, the electronic device 101 may obtain a raw image stored in the shared memory 403a and may obtain the second image by performing the second image processing 407b on the obtained raw image. For example, when the verification request is received, the electronic device 101 may request the second image from the normal environment 310, and may obtain the second image from the normal environment 310 in response to the request for the second image. For another example, when the verification request is received, the electronic device 101 may request generation of the second image from the normal environment 310, may generate the second image through the second image processing 407b on the raw image in the normal environment 310 in response to the request for the generation of the second image, and may obtain the generated second image from the normal environment 310. According to an embodiment, the electronic device 101 may obtain the second image from the normal environment 310 before the verification request is received, and may perform operation 550 to be described later when the verification request is received. According to an embodiment, the electronic device 101 may obtain the second image from the normal environment 310 before the verification request is received, may obtain a third image through operation 550 to be described later, and may perform operation 560 to be described later when the verification request is received.

According to various embodiments, in operation 550, the electronic device 101 may obtain the third image from the second image through first image processing (e.g., the first image processing 405b of FIG. 4) on the second image in the secure environment 320. For example, in the secure environment 320, the electronic device 101 may perform downscaling on the second image obtained from the normal environment 310. The electronic device 101 may obtain the third image obtained by downscaling the second image.

According to various embodiments, in operation 560, in the secure environment 320, the electronic device 101 may identify the integrity of the second image based on the first image and the third image. For example, the electronic device 101 may identify whether the first image and the third image match each other based on image matching and/or feature matching for the first image and the third image. When it is identified that the first image and the third image match each other, the electronic device 101 may identify the integrity (e.g., not tampered) of the second image. According to various embodiments, when the integrity of the second image is identified, the electronic device 101 may sign the second image, which will be described in more detail with reference to the drawings to be described later.

Figure 6:
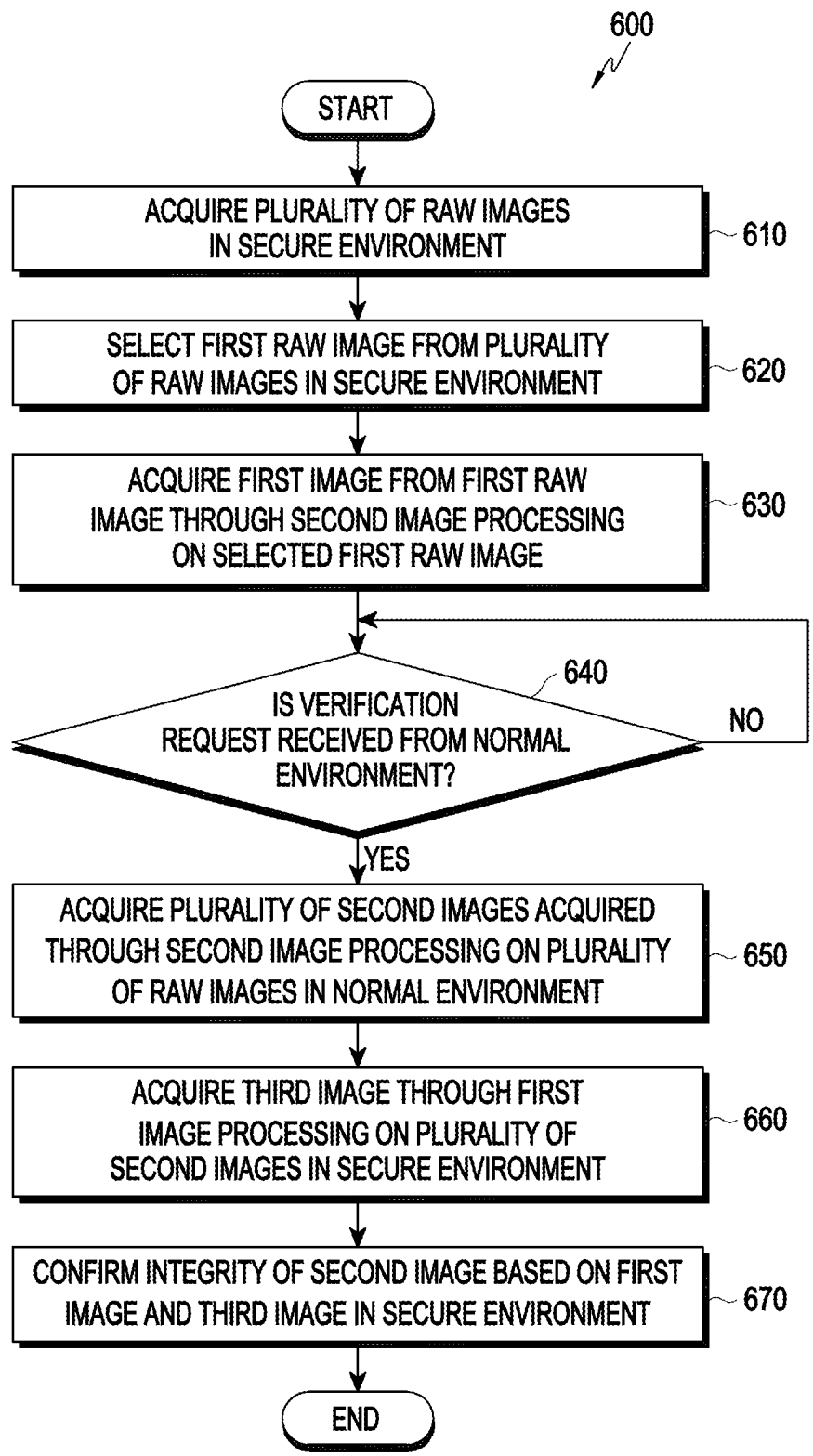
FIG. 6 is a flowchart illustrating a method for an electronic device to identify the integrity of an image obtained in a normal environment when obtaining a plurality of raw images from a camera, according to various embodiments.

FIG. 6 is a flowchart 600 illustrating a method for an electronic device (e.g., the electronic device 101 of FIG. 1) to identify the integrity of an image obtained in a normal environment (e.g., the normal environment 310 of FIG. 4) when obtaining a plurality of raw images from a camera (e.g., the camera module 180 of FIG. 1), according to various embodiments.

According to various embodiments, in operation 610, the electronic device 101 may obtain a plurality of raw images from a secure environment (e.g., the secure environment 320 of FIG. 4). For example, the electronic device 101 may control an image sensor (e.g., the image sensor 230 of FIG. 4) in the secure environment 320 to obtain the plurality of raw images of an external subject from the image sensor 230. The electronic device 101 may photograph a moving picture of the external subject for a specified time, and may obtain a plurality of raw image frames from the image sensor 230 for a specified time. According to various embodiments, the electronic device 101 may store the plurality of obtained raw images in a shared memory (e.g., the shared memory 403a of FIG. 4) in the secure environment 320.

According to various embodiments, in operation 620, in the secure environment 320, the electronic device 101 may select a first raw image from among the plurality of raw images. For example, the electronic device 101 may select one or more raw image frames of a specific period from among the plurality of raw image frames stored in the shared memory 403a. The electronic device 101 may store the selected first raw image in the secure memory 403b. According to various embodiments, the electronic device 101 may select two or more raw image frames, but for convenience of description, in this drawing, an example in which the electronic device 101 selects one raw image frame will be described. When the electronic device 101 selects two or more raw image frames, operation 630 described later may be performed on each of the two or more selected raw image frames, and operations 660 and 670 may be performed on images corresponding to the two or more selected raw image frames.

According to various embodiments, in operation 630, in the secure environment 320, the electronic device 101 may obtain a first image from a first raw image through second image processing (e.g., the second image processing 407a of FIG. 4) on the selected first raw image. Also, the first image processing (e.g., the first image processing 405a of FIG. 4) may be applied at first, the first image thus being obtained via the first and second image processing. According to various embodiments, in the secure environment 320, the electronic device 101 may perform second image processing (e.g., the second image processing 407a of FIG. 4) on the selected first raw image. According to an embodiment, when the electronic device 101 selects two or more raw image frames, the electronic device 101 may perform the second image processing 407*a* on each of the two or more raw image frames, and may obtain two or more first images from the two or more raw image frames.

According to various embodiments, in operation 640, the electronic device 101 may identify whether a verification request is received from the normal environment 310.

According to various embodiments, when the verification request is not received from the normal environment 310, the electronic device 101 may repeat operation 640. For example, the electronic device 101 may repeatedly identify whether the verification request is received until the verification request is received from the normal environment 310.

According to various embodiments, when the verification request is received from the normal environment 310, in operation 650, the electronic device 101 may obtain a plurality of second images obtained through the second image processing (e.g., the second image processing 407*b* of FIG. 4) on the plurality of raw images in the normal environment 310, in the secure environment 320. For example, in the normal environment 310, the electronic device 101 may obtain the plurality of raw images stored in the shared memory 403*a*, and may perform the second image processing 407*b* on each of the plurality of obtained raw images. As a result of performing the second image processing 407*b* on each of the plurality of obtained raw images, the electronic device 101 may obtain a plurality of second images. For example, when the verification request is received, the electronic device 101 may request a plurality of second images from the normal environment 310, and may obtain the plurality of second images from the normal environment 310 in response to the request for the plurality of second images. For another example, when the verification request is received, the electronic device 101 may request generation of the second image on each of the plurality of raw images from the normal environment 310, may generate the plurality of second images through the second image processing 407*b* on each of the plurality of raw images in the normal environment 310 in response to the request for the generation of the second image, and may obtain the plurality of generated second images from the normal environment 310. According to an embodiment, the electronic device 101 may obtain the plurality of second images from the normal environment 310 before the verification request is received, and may perform operation 660 to be described later when the verification request is received. According to an embodiment, the electronic device 101 may obtain the plurality of second images from the normal environment 310 before the verification request is received, may obtain the third image through operation 660 to be described later, and may perform operation 670 to be described later when the verification request is received.

According to various embodiments, in operation 660, the electronic device 101 may obtain the third image through the first image processing on the plurality of second images in the secure environment 320. For example, the electronic device 101 may select the second image corresponding to the selected first raw image (e.g., the first raw image selected in operation 620) from among the plurality of second images obtained from the normal environment 310, and may obtain the selected second image as the third image. When the electronic device selects two or more raw image frames of a specific period in operation 620, the electronic device 101 may select two or more second images corresponding to the specific period (e.g., corresponding to the selected two or more raw image frames) and may obtain the selected two or more second images as two or more third images.

According to various embodiments, in operation 670, the electronic device 101 may identify the integrity of the second image based on the first image and the third image. For example, the electronic device 101 may identify whether the first image and the third image match each other based on image matching and/or feature matching for the first image and the third image. When the electronic device 101 selects the two or more raw image frames of the specific period in operation 620, the electronic device 101 may identify whether each of the first image and the third image matches each other based on image matching and/or feature matching for each of the plurality of first images and the plurality of third images. According to various embodiments, when it is identified that the first image (or each first image) and the third image (or each third image) match each other, the electronic device 101 may identify the integrity of the second image (or each second image). According to various embodiments, when the integrity of the second image (or each second image) is identified, the electronic device 101 may sign the second image (or each second image), which will be described in more detail with reference to drawings to be described later.

Figure 7:
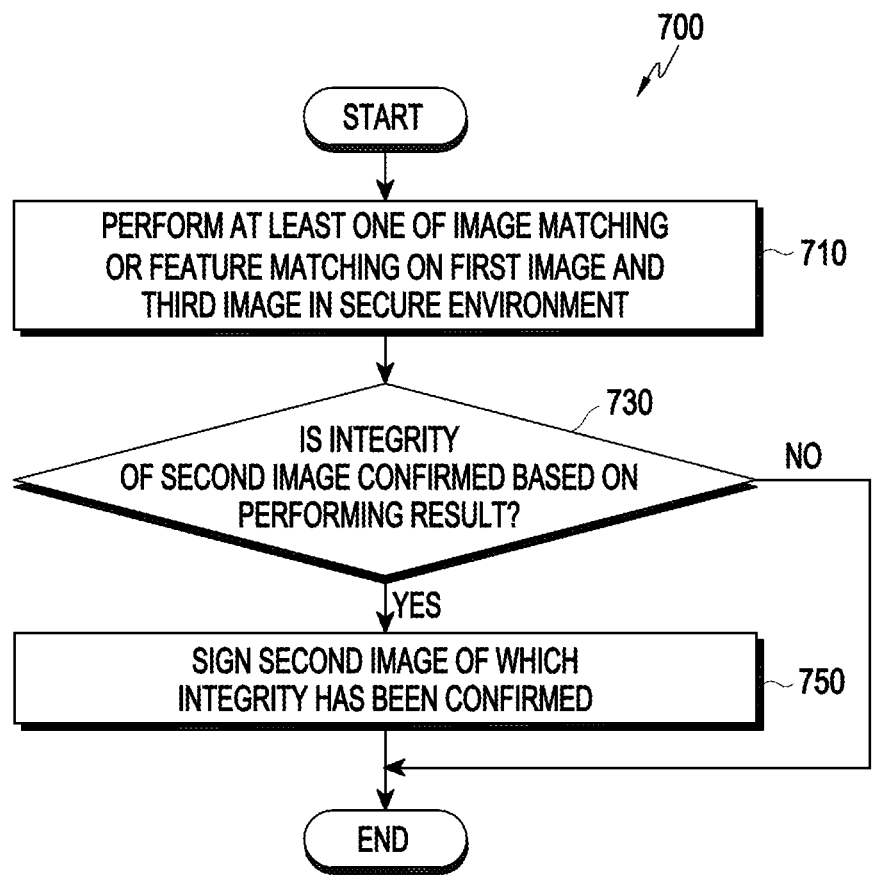
FIG. 7 is a flowchart illustrating an operation for an electronic device to determine whether to sign a second image based on whether a first image and a third image match each other in a secure environment, according to various embodiments.

FIG. 7 is a flowchart 700 illustrating an operation for an electronic device (e.g., the electronic device 101 of FIG. 1) to determine whether to sign a second image based on whether a first image and a third image match each other in a secure environment (e.g., the secure environment 320 of FIG. 4), according to various embodiments.

According to various embodiments, in operation 710, the electronic device 101 may perform at least one of image matching or feature matching with respect to a first image and a third image in the secure environment 320. For example, the first image may be an image obtained based on first image processing (e.g., the first image processing 405*a* in FIG. 4) and second image processing (e.g., the second image processing 407*a* in FIG. 4) on the raw image in secure environment 320. For example, the third image may be an image obtained based on second image processing (e.g., the second image processing 407*b* in FIG. 4) on the raw image in a normal environment (e.g., the normal environment 310 of FIG. 4) and first image processing (e.g., the first image processing 405*b* of FIG. 4) in the secure environment 320.

According to various embodiments, the electronic device 101 may apply compensation at the time of image matching or feature matching for the first image and the third image, based on a difference (e.g., demosaicing distortion) between the first image and the third image. For example, the electronic device 101 may perform pre-processing (e.g., filtering) on the raw image. The electronic device 101 may obtain an RGB image of the pre-processed raw image by performing demosaicing(e.g., Menon demosaicing) on the pre-processed raw image, and may obtain a first comparison image obtained by resizing the obtain RGB image. The electronic device 101 may resize the pre-processed raw image, and may perform demosaicing on the resized raw image to obtain the RGB image of the resized raw image as a second comparison image. The electronic device 101 may identify a difference between the first comparison image and the second comparison image to obtain compensation data. In the secure environment 320, the electronic device 101 may obtain a first image compensated by applying (e.g., subtraction) the identified difference to the first image, and may perform image matching on the compensated first image and third image to identify whether the first image and the third image match each other. For another example, the electronic device 101 may perform feature matching on the first image and the third image based on a feature (e.g., DAISY, histogram of oriented gradient (HOG), or local binary patterns (LBP)) extracted with respect to the difference between the first image and the third image, thereby identifying whether the first image and the third image match each other. For another example, the electronic device 101 may perform image matching on the first image and the third image based on image segmentation for the difference between the first image and the second image, or may perform feature matching on the first image and the third image based on a convolutional neural network (CNN) for the difference between the first image and the third image to identify whether the first image and the third image match each other. Here, a method of applying compensation at the time of image matching or feature matching for the first image and the third image is not limited to the above-described examples.

According to various embodiments, in operation 730, the electronic device 101 may determine whether the integrity of the second image is identified based on the performance result.

According to various embodiments, when it is identified that the first image and the third image do not match each other as a result of performing operation 710, the electronic device 101 may determine that the integrity of the second image is not identified and may not perform operation 750.

According to various embodiments, when it is identified that the first image and the third image match each other as a result of performing operation 710, the electronic device 101 may determine that the integrity of the second image is identified. In operation 750, the electronic device 101 may sign the second image of which integrity has been identified. For example, the electronic device 101 may generate signature information of the second image from image hash information and/or feature hash information of the second image by using a device private key related to the second image. The electronic device 101 may allow the generated signature information to be included in metadata associated with the second image. According to an embodiment, after generating the signature information of the second image, the electronic device 101 may provide the signed second image to an application (e.g., the application 413 of FIG. 4) and/or an external electronic device (e.g., the external electronic device 415 of FIG. 4).

Figure 8:
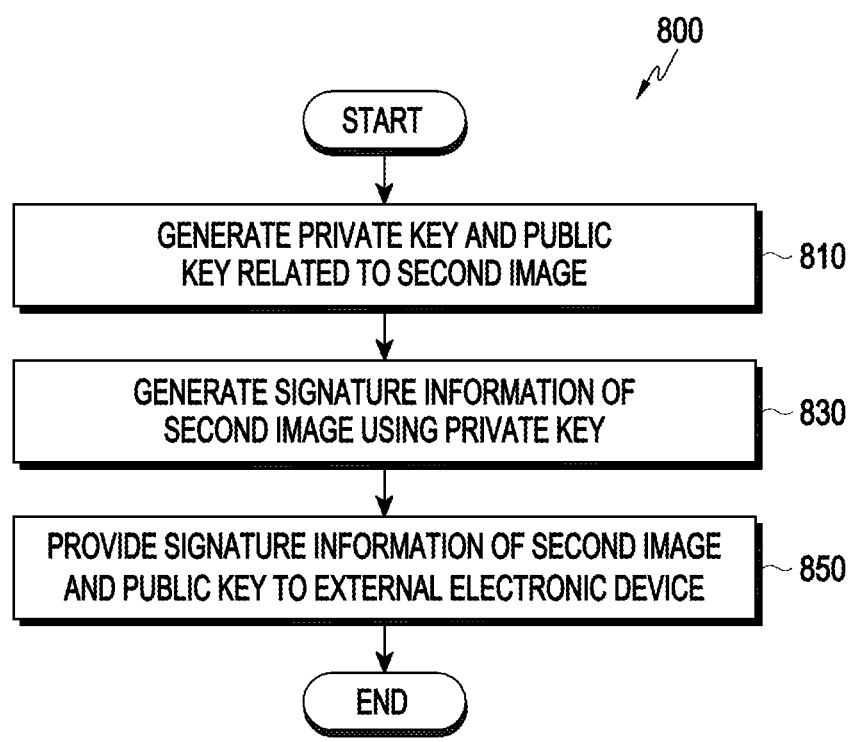
FIG. 8 is a flowchart illustrating a method for an electronic device to provide a signed second image to an external electronic device in a secure environment, according to various embodiments.

FIG. 8 is a flowchart 800 illustrating a method for an electronic device (e.g., the electronic device 101 of FIG. 1) to provide a signed second image to an external electronic device (e.g., the external electronic device 415 of FIG. 4) in a secure environment (e.g., the secure environment 320 of FIG. 4), according to various embodiments.

According to various embodiments, in operation 810, the electronic device 101 may generate a private key (e.g., a device private key) and a public key (e.g., a device public key) related to the second image. For example, the generated private key and the generated public key may correspond to each other (e.g., may be a pair).

According to various embodiments, in operation 830, the electronic device 101 may generate signature information of the second image by using the private key. For example, the electronic device 101 may extract image hash information and/or feature hash information of the second image from the second image. The electronic device 101 may generate the signature information of the second image from the extracted image hash information and/or the extracted feature hash information using the private key.

According to various embodiments, in operation 850, the electronic device 101 may provide the signature information and the public key of the second image to the external electronic device 415. For example, the electronic device 101 may transmit the signature information and the public key to the external electronic device 415 through a communication circuit (e.g., the communication module 190 of FIG. 1). According to an embodiment, the electronic device 101 may provide the generated public key to the external electronic device 415 before performing operation 830, and may then transmit the signature information of the second image to the external electronic device 415 in operation 850.

According to various embodiments, an electronic device may include at least one memory, a camera, and at least one processor, wherein the at least one processor is configured to obtain raw image for an external object from the camera in a secure environment, to store the obtained raw image in the at least one memory, to obtain first image from the raw image through first image processing and second image processing on the stored raw image in the secure environment, to obtain, in the secure environment, second image obtained from the raw image through the second image processing for the stored raw image in a normal environment, based on obtaining of a verification request from the normal environment: to obtain third image from the second image through the first image processing for the obtained second image in the secure environment, and to identify integrity of the second image based on the obtained first image and the obtained third image.

Thus, the raw image is processed in two different ways: On the one hand the raw image is processed at first via the first image processing and subsequently via second image processing, resulting in the first image, and on the other hand the one raw image is processed at first via the second image processing, resulting in the second image, and subsequently via the first image processing, resulting in the third image. The first image processing may in particular be a downscaling operation, the second image processing may in particular be a demosaicing operation. The image processing herein may be understood as respective processing means, e.g. a program or routine run by the processor adapted to process the image as explained. While the image processes resulting in the first image are both performed within the secure environment, only the first image processing resulting in the third image is performed in the secure environment while the second image processing resulting in the second image is performed in the normal environment.

The integrity of the second image, i.e. of the raw image that has been processed by the second image processing, can be identified based on an evaluation of the first and third image, in particular by comparing the first and third image. Due to processing the raw image in these two different ways a difference (e.g., demosaicing distortion) may occur between the first image and the third image. The at least one processor (e.g., the processor 120) may determine whether the first image and the third image match each other in consideration of this difference. If the images match, the integrity of the second image is identified. The first image may thus be understood as "verification data" as it is used to verify the integrity of the second image. This verification data is securely generated as the first image is the result of processes performed within the secure environment.

As the first and second image processing resulting in the first image as well as the first image processing resulting in the third image is performed within the secure environment, the security of the procedure is enhanced. The second image processing resulting in the second image, however, is performed in the normal environment where less processing power is needed so that the full-scale raw image can be used. Processing the raw image via the second image processing (e.g.demosaicing) would require significantly more resources when done for the full-scale image within the secured environment. Thus, image processing that requires a lot of resources with regard to user images may be performed in the normal environment while allowing for the identification of integrity of images that have undergone image processing in the normal environment by using verification data generated in a secure environment, thereby reducing resources for image processing used in the secure environment, and preventing risks of counterfeit/modification that may otherwise occur in the normal environment by shifting processes to the secured environment.

The steps of obtaining the second and third image and of identifying the integrity of the second image may be performed based on a verification request, i.e. when a verification request is obtained/received from the normal environment. Thus, the processor may be configured to obtain a verification request from a normal environment. Also, the step of obtaining the second image may be performed beforehand and the second image may be stored to be used later when a verification request is obtained/received. The second image may be stored in the secure environment and/or the normal environment, e.g. in a shared memory and/or in a secure memory.

According to various embodiments, an electronic device may include at least one memory, a camera, and at least one processor, wherein the at least one processor is configured to obtain raw image for an external object from the camera in a secure environment, to store the obtained raw image in the at least one memory, to obtain first image from the raw image through first image processing and second image processing of the stored raw image in the secure environment, to obtain second image from the raw image through the second image processing of the stored raw image in a normal environment, to obtain third image from the second image through the first image processing of the obtained second image in the secure environment, and to identify integrity of the second image based on the obtained first image and the obtained third image.

Thus, the raw image is processed in two different ways: On the one hand the raw image is processed at first via the first image processing and subsequently via second image processing, resulting in the first image, and on the other hand the raw image is processed at first via the second image processing, resulting in the second image, and subsequently via the first image processing, resulting in the third image. The first image processing may in particular be a downscaling operation, the second image processing may in particular be a demosaicing operation. The image processing herein may be understood as respective processing means, e.g. a program or routine run by the processor adapted to process the image as explained. While the image processes resulting in the first image are both performed within the secure environment, only the first image processing resulting in the third image is performed in the secure environment while the second image processing resulting in the second image is performed in the normal environment.

The integrity of the second image, i.e. of the raw image that has been processed by the second image processing, can be identified based on an evaluation of the first and third image, in particular by comparing the first and third image. Due to processing the raw image in these two different ways a difference (e.g., demosaicing distortion) may occur between the first image and the third image. The at least one processor (e.g., the processor 120) may determine whether the first image and the third image match each other in consideration of this difference. If the images match, the integrity of the second image is identified. The first image may thus be understood as "verification data" as it is used to verify the integrity of the second image. This verification data is securely generated as the first image is the result of processes performed within the secure environment.

As the first and second image processing resulting in the first image as well as the first image processing resulting in the third image is performed within the secure environment, the security of the procedure is enhanced. The second image processing resulting in the second image, however, is performed in the normal environment where usually less processing power is needed so that the full-scale raw image can be used. Processing the raw image via the second image processing (e.g.demosaicing) would require significantly more resources when done for the full-scale image within the secured environment. Thus, image processing that requires a lot of resources with regard to user images may be performed in the normal environment while allowing for the identification of integrity of images that have undergone image processing in the normal environment by using verification data generated in a secure environment, thereby reducing resources for image processing used in the secure environment, and preventing risks of counterfeit/modification that may otherwise occur in the normal environment by shifting processes to the secured environment.

The steps of obtaining the second and third image and of identifying the integrity of the second image may be performed based on a verification request, i.e. when a verification request is obtained/received from the normal environment. Thus, the processor may be configured to obtain a verification request from a normal environment. Alternatively, the step of obtaining the second image may be performed beforehand and the second image may be stored to be used later when a verification request is obtained/received. The second image may be stored in the secure environment and/or the normal environment, e.g. in a shared memory and/or in a secure memory.

According to various embodiments, the first image processing may include at least one of selecting at least one image from a plurality of images or downscaling the at least one image. Downscaling the image may reduce the computational resources needed for the following processes. This is relevant in particular for the subsequent image processing performed in the secure environment, i.e. the second image processing resulting in the first image, as this allows the second image processing to be performed securely with less resources.

According to various embodiments, the second image processing may include at least one of a 3A operation based on at least one image, an image signal processing operation, or a post-processing operation. 3A operations are in particular auto-focusing, auto-exposure, and auto-white balance adjustment. An image signal processing operation may e.g. be demosaicing. Performing one or more of such operations allows via the two different ways explained above allows to determine the integrity of the second image by comparing the first and third image.

According to various embodiments, the at least one processor may be configured to obtain, when a first raw image of the external object is obtained from the camera in the secure environment, a first image from the first raw image through downscaling and second image processing on the first raw image in the secure environment. Downscaling the image may reduce the computational resources needed for the following second image processing. This is relevant in particular for the second image processing resulting in the first image as this allows the second image processing to be performed securely with less resources.

According to various embodiments, the at least one processor may be further configured to obtain the second image from the first raw image through second image processing on the obtained first raw image in the normal environment, and may provide the obtained second image to the secure environment.

According to various embodiments, the at least one processor may be configured to obtain the third image from the second image through downscaling for the second image in the secure environment, and identify integrity of the second image based on at least one of image matching or feature matching for the obtained first image and the obtained third image.

According to various embodiments, the at least one processor may be configured to select, when a plurality of raw images for the external object are obtained from the camera in the secure environment, at least one raw image among the plurality of raw images in the secure environment, and to obtain the at least one first image from the selected at least one raw image through second image processing on the selected at least one raw image. The at least one raw image or all of the plurality of raw images may be processed by the first image processing first, may in particular be downscaled.

According to various embodiments, the at least one processor may be further configured to obtain a plurality of second images from the plurality of raw images obtained through second image processing on the obtained plurality of raw images in the normal environment, and to provide the plurality of obtained second images to the secure environment.

According to various embodiments, the at least one processor may select the at least one second image from among the plurality of obtained second images to obtain the at least one third image in the secure environment. Processing not all but only part of the plurality of second images may be more efficient as the subsequent steps need not be performed for every second image, in particular only one third image may need to be obtained.

According to various embodiments, the at least one third image is obtained through downscaling on the at least one second image selected from the plurality of second images. Downscaling the image may reduce the computational resources needed for the following steps, in particular for identification of the integrity of the second image by comparison of the first and third image.

According to various embodiments, the at least one processor may be configured to identify integrity of the at least one second image based on at least one of image matching or feature matching on the obtained at least one first image and the obtained at least one third image in the secure environment. Such matching processes allow for an efficient identification of the integrity.

According to various embodiments, the at least one processor may be further configured to sign the second image when the integrity of the second images is identified. This way it may be recorded that the integrity of the second image is present.

According to various embodiments, the at least one processor may be further configured to generate a private key associated with the second image and a public key corresponding to the private key.

According to various embodiments, the at least one processor may be further configured to generate signature information of the second image using the private key, and wherein the signature information is generated based on at least one of hash information of the second image or feature information of the second image.

According to various embodiments, the electronic device may further include a communication circuit, wherein the at least one processor may be further configured to provide the public key to an external electronic device using the communication circuit.

According to various embodiments, the at least one memory may include a shared memory and a secure memory. This allows for images to be saved securely in the secure memory and less securely but more readily available and/or changeable in the shared memory as explained above.

According to various embodiments, the at least one processor may be further configured to store the raw image in the shared memory in the secure environment, and may perform first image processing on the raw image stored in the shared memory in the secure environment, and may then store the raw image processed through the first image processing in the secure memory. This allows for securely caching the raw image before performing the second image processing.

According to various embodiments, the at least one processor may be configured such that write authority to the shared memory may be restricted in the normal environment and write authority to the shared memory may be allowed in the secure environment. This enhances the security.

According to various embodiments, a method of controlling an electronic device, the method may include obtaining raw image for an external object from the camera in a secure environment and storing the obtained raw image in the at least one memory, obtaining first image from the raw image through first image processing and second image processing on the stored raw image in the secure environment, obtaining, in the secure environment, second image obtained from the raw image through the second image processing for the stored raw image in a normal environment, and based on obtaining of a verification request from the normal environment: obtaining third image from the second image through the first image processing for the obtained second image in the secure environment, and identifying integrity of the second image based on the obtained first image and the obtained third image.

The explanations made for the device above apply mutatis mutandis to the method as well. The device is configured to perform the method. The method can thus be performed by the device.

According to various embodiments, a method of controlling an electronic device is provided, the method may include obtaining raw image of an external object from the camera in a secure environment and storing the obtained raw image in the at least one memory, obtaining first image from the raw image through first image processing and second image processing of the stored raw image in the secure environment, obtaining second image from the raw image through the second image processing of the stored raw image in a normal environment, obtaining third image from the second image through the first image processing of the obtained second image in the secure environment, and identifying integrity of the second image based on the obtained first image and the obtained third image.

The explanations made for the device above apply mutatis mutandis to the method as well. The device is configured to perform the method. The method can thus be performed by the device.

According to various embodiments, wherein the first image processing may include at least one of selecting at least one image from a plurality of images or downscaling the at least one image, and wherein the second image processing may include at least one of a 3A operation based on at least one image, an image signal processing operation, or a post-processing operation.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   at least one memory storing one or more computer programs;
   a camera; and
   at least one processor,
   wherein the one or more computer programs include computer-executable instructions that, when executed by the at least one processor, cause the electronic device to:
      obtain a raw image for an external object from the camera in a secure environment of the at least one processor and store the raw image in the at least one memory,
      obtain, in the secure environment, a first image by performing first image processing on the raw image and second image processing on an output of the first image processing of the raw image,
      obtain, in a normal environment of the at least one processor, a second image by performing the second image processing on the raw image, and
      based on obtaining of a verification request related to the second image:
         obtain, in the secure environment, the second image,
         obtain, in the secure environment, a third image by performing the first image processing on the second image, and
         identify integrity of the second image based on comparing the first image and the third image.

2. The electronic device of claim 1, wherein the first image processing includes at least one of selecting at least one image from a plurality of images or downscaling the at least one image.

3. The electronic device of claim 1, wherein the second image processing includes at least one of an auto-focusing, an auto-exposure, an auto-white balance adjustment, an image signal processing operation, or a post-processing operation.

4. The electronic device of claim 1, wherein the one or more computer programs further include computer-executable instructions that, when executed by the at least one processor, cause the electronic device to obtain, when a first raw image of the external object is obtained from the camera in the secure environment, the first image from the first raw image through downscaling and the second image processing on the first raw image in the secure environment.

5. The electronic device of claim 4, wherein the one or more computer programs further include computer-executable instructions that, when executed by the at least one processor, cause the electronic device to:
obtain the second image from the first raw image through the second image processing on the obtained first raw image in the normal environment, and
provide the obtained second image to the secure environment.

6. The electronic device of claim 5, wherein the one or more computer programs further include computer-executable instructions that, when executed by the at least one processor, cause the electronic device to:
obtain the third image from the second image through downscaling for the second image in the secure environment, and
identify integrity of the second image based on at least one of image matching or feature matching for the obtained first image and the obtained third image in the secure environment.

7. The electronic device of claim 1, wherein the one or more computer programs further include computer-executable instructions that, when executed by the at least one processor, cause the electronic device to:
select, when a plurality of raw images for the external object are obtained from the camera in the secure environment, at least one raw image among the plurality of raw images in the secure environment, and
obtain at least one first image from the selected at least one raw image through the second image processing on the selected at least one raw image in the secure environment.

8. The electronic device of claim 7, wherein the one or more computer programs further include computer-executable instructions that, when executed by the at least one processor, cause the electronic device to:
obtain a plurality of second images from the plurality of raw images obtained through the second image processing on the obtained plurality of raw images in the normal environment, and
provide the plurality of obtained second images to the secure environment.

9. The electronic device of claim 8, wherein the one or more computer programs further include computer-executable instructions that, when executed by the at least one processor, cause the electronic device to select at least one second image from among the plurality of obtained second images to obtain at least one third image in the secure environment.

10. The electronic device of claim 9, wherein the at least one third image is obtained through downscaling on the at least one second image selected from the plurality of second images.

11. The electronic device of claim 9, wherein the one or more computer programs further include computer-executable instructions that, when executed by the at least one processor, cause the electronic device to identify integrity of the at least one second image based on at least one of image matching or feature matching on the obtained at least one first image and the obtained at least one third image in the secure environment.

12. The electronic device of claim 1, wherein the one or more computer programs further include computer-executable instructions that, when executed by the at least one processor, cause the electronic device to sign the second image when the integrity of the second image is identified.

13. The electronic device of claim 12, wherein the one or more computer programs further include computer-executable instructions that, when executed by the at least one processor, cause the electronic device to generate a private key associated with the second image and a public key corresponding to the private key.

14. The electronic device of claim 13,
wherein the one or more computer programs further include computer-executable instructions that, when executed by the at least one processor, cause the electronic device to generate signature information of the second image using the private key, and
wherein the signature information is generated based on at least one of hash information of the second image or feature information of the second image.

15. The electronic device of claim 13, further comprising:
a communication circuit,
wherein the one or more computer programs further include computer-executable instructions that, when executed by the at least one processor, cause the electronic device to provide the public key to an external electronic device using the communication circuit.

16. The electronic device of claim 1, wherein the at least one memory includes a shared memory and a secure memory.

17. The electronic device of claim 16, wherein the one or more computer programs further include computer-executable instructions that, when executed by the at least one processor, cause the electronic device to:
store the raw image in the shared memory in the secure environment, and
perform first image processing on the raw image stored in the shared memory in the secure environment, and then store the raw image processed through the first image processing in the secure memory.

18. The electronic device of claim 16, wherein the one or more computer programs further include computer-executable instructions that, when executed by the at least one processor, cause the electronic device to such that write authority to the shared memory is restricted in the normal environment and write authority to the shared memory is allowed in the secure environment.

19. A method of controlling an electronic device, the method comprising:
obtaining a raw image for an external object from a camera in a secure environment of at least one processor included in the electronic device and storing the raw image in at least one memory;
obtaining, in the secure environment, a first image by performing first image processing on the raw image and second image processing on an output of the first image processing of the raw image;

obtaining, in a normal environment of the at least one processor, a second image by performing the second image processing on the raw image; and based on obtaining a verification request related to the second image:
- obtaining, in the secure environment, the second image,
- obtaining, in the secure environment, a third image by performing the first image processing on the second image, and
- identifying integrity of the second image based on comparing the first image and the third image.

20. The method of claim 19,
wherein the first image processing includes at least one of selecting at least one image from a plurality of images or downscaling the at least one image, and
wherein the second image processing includes at least one of an auto-focusing, an auto-exposure, an auto-white balance adjustment, an image signal processing operation, or a post-processing operation.

* * * * *